United States Patent [19]

Fichtner et al.

[11] Patent Number: 4,600,821
[45] Date of Patent: Jul. 15, 1986

[54] APPARATUS FOR INDUCTIVELY HEATING FLUID

[75] Inventors: Hans E. Fichtner, Krefeld; Franz Klaus, Bochum, both of Fed. Rep. of Germany

[73] Assignee: Franz Klaus Union Armaturen Pumpen GmbH & Co., Bochum, Fed. Rep. of Germany

[21] Appl. No.: 469,626

[22] Filed: Feb. 25, 1983

[30] Foreign Application Priority Data

Feb. 27, 1982 [DE] Fed. Rep. of Germany ....... 3207436

[51] Int. Cl.⁴ .............................................. H05B 6/10
[52] U.S. Cl. .......................... 219/10.51; 219/10.49 R; 219/10.65; 219/10.79
[58] Field of Search ...................... 219/10.49 R, 10.51, 219/10.65, 10.75, 10.57, 10.79; 417/420

[56] References Cited

U.S. PATENT DOCUMENTS

| | | | |
|---|---|---|---|
| 3,272,956 | 9/1966 | Baermann | 219/10.49 R |
| 3,373,927 | 3/1968 | Miller | 417/420 |
| 3,630,645 | 12/1971 | Eheim | 417/420 |
| 3,812,315 | 5/1974 | Martin | 219/10.65 X |
| 3,821,508 | 6/1974 | Hagerty | 219/10.51 X |
| 4,217,475 | 8/1980 | Hagerty | 219/10.51 |
| 4,238,337 | 12/1980 | Peters et al. | 219/10.49 R X |
| 4,421,967 | 12/1983 | Birgel et al. | 219/10.51 |

FOREIGN PATENT DOCUMENTS 773742  5/1957  United Kingdom ......... 219/10.49 X

Primary Examiner—Philip H. Leung
Attorney, Agent, or Firm—Robert E. Burns; Emmanuel J. Lobato; Bruce L. Adams

[57] ABSTRACT

The invention relates to a unit and a plant with such a unit as part thereof, based on the use of eddy currents for turning mechanical energy into heat energy for heating a fluid. The unit has a driver with at least one permanent magnet and is mechanically driven and takes effect on a rotor placed on the other side of a separating wall. The rotor is fitted with at least one permanent magnet and is turned by the magnetic attraction. The magnetic field, turning in relation to the separating wall, is at the same time responsible for causing eddy currents in the wall and for this reason for the production of heat which is given up to the fluid. In a preferred form of the invention, the rotor side of the unit is completely encapsuled and only one side of the separating wall is acted upon by the fluid so that even fluids that are strong or unstable chemicals may be heated. The heat producing unit may be automatically controlled with almost no time lag and the temperature may be automatically controlled within very fine limits.

26 Claims, 3 Drawing Figures

APPARATUS FOR INDUCTIVELY HEATING FLUID

BACKGROUND OF THE INVENTION

The present invention relates to a unit for heating a fluid and a plant using such a unit as a part thereof.

Units and complete systems based thereon for heating fluids are known in a great number of different forms. In many private houses and in industry, instantaneous water heaters, run for example on gas or electricity, are in use, in which the desired temperature of the heated fluid is controlled by turning on and off the heating fluid or energy carrier or by changing its rate of flow. In less frequent cases heat is produced in fluid heating apparatus by internal friction, for example in a liquid, or eddy currents are used, that are produced in a conductor when it is moved through a magnetic field.

As a rule mechanical energy is not turned directly into heat energy, because the conversion of primary energy, for example in the form of the force of the wind or of water, into electrical energy has made it possible for the energy to be put to many more different purposes and furthermore, it is then simpler for the energy to be supplied to the point at which it is needed. This being so, it is hardly surprising that for heating purposes nearly the only forms of apparatus used are those run on oil, gas or electricity. For some special purposes, however, such heating apparatus as are presently widely used have great shortcomings.

Whereas under steady state conditions it is relatively simple to keep an adjustment to a given temperature, known automatic control and heating systems designed so far have such a slow response under dynamic or changing conditions that is very hard to keep the temperature of the heated fluid within a narrow range without the output temperature changing every time there is a change in the input temperature and without being dependent on its flow rate, this being, more specially, because of a certain lag in the heating effect, caused by stored heat, at the points at which heat is given up by the heat producing or supply parts to the fluid to be heated. It is for this reason that so far automatic control with the quickest possible response time has been produced by using instantaneous heaters in which the heating coil element is placed right in the flowing fluid to be heated. The use of such apparatus is however limited to liquids with a high electrical resistance and to those that are not flammable.

SUMMARY OF THE INVENTION

For this reason one purpose or object of the present invention is that of designing a unit or a plant based on the use thereof for heating a fluid which may be automatically controlled with generally no time lag and which may be used with all sorts of fluids, that is to say even for explosive and incompatible substances.

For effecting this and other purposes a unit for heating a flowing fluid in keeping with the present invention may be said to be characterized by a turning driver having at least one magnetic part, a rotor (that has at least one magnet) driven magnetically by the driver, and a separating wall, placed between the driver and the rotor, that has a low electrical resistance and is in contact with the moving fluid to be heated. In the case of a plant for heating a fluid in keeping with the invention, there is a prime mover drive in the form of an electric motor or an internal combustion engine whose output shaft is joined with the magnetic driver functioning as the heat producer, that is used with the magnetic rotor turned by the driver, the separating wall therebetween having a low electrical resistance and being placed in contact with the moving fluid.

It will be seen from this that in the invention it is a question of a stationary electrical conductor, whose mass is as low as possible and that is pervaded by a continuously turning or rotating magnetic field. There are in fact two groups of magnets on the two sides of the separating wall, of which the one group is mechanically turned and the other is turned by the magnetic effect or magnetically transmitted torque. The design of the two groups of magnets may in fact be like that of magnetic clutches, that is to say for example two clutch halves with plane radial faces magnetically facing each other through the separating wall or two such clutch members of cylindrical form with a sleeve-like separating wall therebetween.

The flow of the fluid, that is to say gas-like or liquid material, onto the separating or parting wall may take place on its two side walls, or if the unit is encapsuled without any stuffing boxes for a shaft, the flow thereonto will only be on one side thereof. The reasons for this will be made clear hereinafter.

The main materials that may be used for the separating wall are copper or aluminum, although for some special-purpose uses other materials can be used inasfar as they keep to the conditions of having a low electrical resistance and at the same time a resistance to strong chemicals, that is to say chemical stability or corrosion resistance. For stepping up the transfer of heat from the separating wall to the fluid the wall may have fins, helical structures or other surface forms increasing its surface area, although in this connection it has to be kept in mind that such measures are not to be such as to give a longer time in the automatic control system. The automatic control function may be effected in a number of different ways. In the simplest possible form thereof the speed of the driving motor is matched to the desired temperature, this being done directly or by way of a steplessly adjustable transmission between the prime mover, that is to say the motor (or engine), and the unit. For very accurate automatic control operations a so-called "stop motor" may be used as the prime mover, that may be very quickly stopped, that is to say braked from its rated speed down to a zero speed. In this way the input of energy may be turned off quite sharply so that the heating effect will be stopped at once, and there will be next to no further heating or thermal effect producing a control function lag. A high-quality automatic control effect of the same sort may be furthermore produced if the driver or the rotor or the two of them may be moved axially towards and away from each other, this changing the intensity of the eddy currents within the separating wall. Dependent on the selection of the form of drive for the adjustment, such adjustment may furthermore be caused to take place at a very high speed, this giving a representatively quick-response automatic control effect. As a last possible form of automatic control, the throughflow rate may be adjusted while keeping the energy input to the said wall unchanged so that the temperature may be matched to the desired value. However this form of matching is only able to be used when the throughflow rate is unimportant and may in fact be freely selected.

In view of the fact that the driver and the rotor are turning in the heat producer in keeping with the invention when producing heat, only a simple change in structure is needed for one of the two turning parts to be fitted with a propeller or a pumping impellor for forcing the fluid through the heat producer without any outside pumping means. Then there will be no need to have a backup pump in cases in which the pressures necessary for keeping up the flow of the fluid are not high. This design is possible furthermore with a fully encapsuled system, in which the fluid is moved through the heat producer and only comes into contact with stationary, and not with moving sealing faces, that is to say only with gaskets and not with glands. The pumping means within the unit, that is to say a bladed wheel for example, will then be fixed to the rotor, the same turning in the encapsulated part without having any shaft running through the capsule wall.

An encapsuled form of the heat producer or generator in keeping with the invention gives the useful effect of being able to be used for heating that carriers or vehicles, that are not to come into contact with atmospheric oxygen, such heat carriers being used in the chemical industry under the name of Diphyl for example. For use as heat carriers in chemical processes they are heated up at a heating station and then supplied to the different points (at some distance therefrom) in the chemical plant by insulated pipes. The distance having to be covered in this respect may be so great that there is an undesired cooling down of the carrier fluid and it has to be heated up again at the point where input of heat to the process is needed. Heat producers with lead-through connectors and the like are undesired here because contact of the Diphyl with the outside air may be the cause of an explosion, which is to be prevented at all costs.

In this respect the invention is of great value as a starting point for the design of such systems inasfar as with the sturdy structure with seals having large surface areas and the fully encapsulated form, the sealing effect (stopping leaks) is generally of the same level as in a normal pipe connection using flanges. A further point is that the quick-response automatic control effect noted hereinbefore is of value in causing a safe primary heating effect in connection with the heat carrier and any necessary further heating of the fluid may be effected as desired.

Further useful effects and details of the invention may now be taken from the account to be given of certain working examples of the invention using the figures.

DETAILED DESCRIPTION OF THE INVENTION

Figure 1:
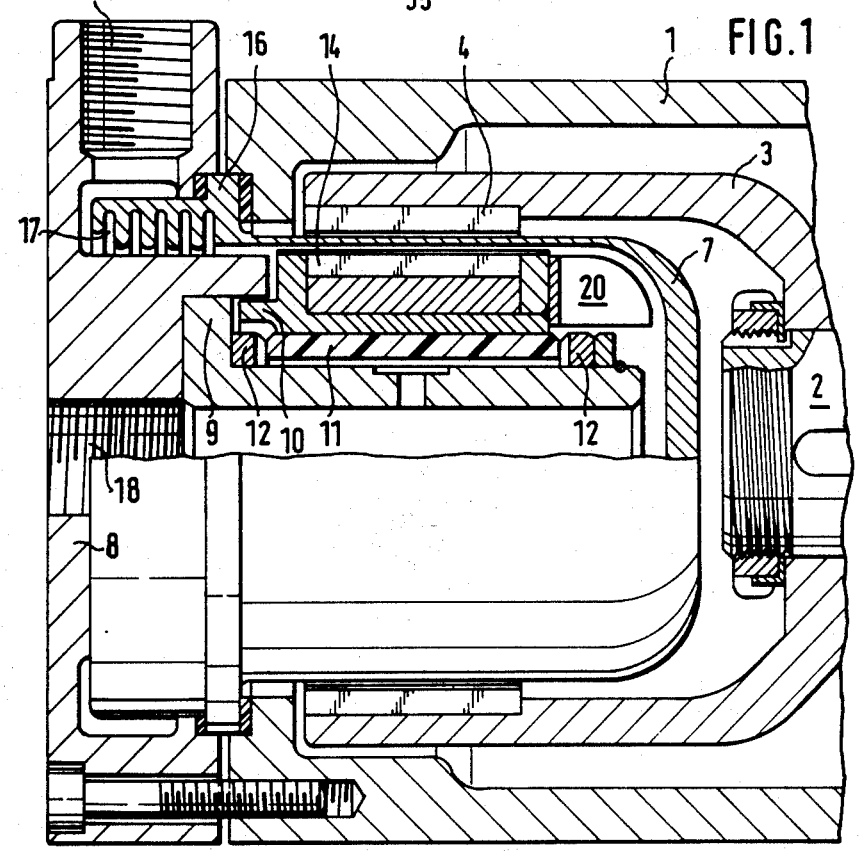
FIG. 1 is a section view of one unit constructed according to the invention for heating a moving fluid, as a first working example of the invention.

Turning now firstly to FIG. 1, the reader will see that a heat producer or generator is walled in on all sides by a housing 1, in which a driving shaft 2 is supported by a normal bearing, the shaft being driven for example by an electric motor. A rotary member in the form of a driver 3 is keyed on the shaft 2 and has the general shape of a cylindrical bell whose front end has a complete ring (that is to say one extending through a full circle) of permanent magnets 4 fixed to it. The permanent magnets 4 are placed round a pot 7 whose cylindrical wall is thin and on the right hand side is shut off by the end plate or wall of the pot. At the other, opposite end of the pot 7 there is a rim 16 that is gripped between the housing 1 and a cover 8 thereof.

In the cover 8 a sleeve 9 is fixed in place, the same functioning as a bearing for a second rotary member in the form of a rotor 10, that has an inner cylindrical face round a bearing bush 11 running on the bearing face of the sleeve 9 and kept in place in the axial direction by thrust bearings 12. The rotor 10 as well as permanent magnets 14 that are axially lined up with the permanent magnets 4 of the driver and are placed side-by-side in a complete ring without any spaces therebetween. The permanent magnets 4 and 14 comprise magnetic flux generating means and are placed as near to the cylindrical surfaces of the pot 7 as possible and it is only to let free motion of fluid take place that it may be best to have a space of 1 mm, on average, between them and the pot 7.

For heating a moving fluid, as for example a liquid, the liquid is first let into the heater in keeping with the invention. For this purpose there is a an inlet port 18 placed in the middle of the cover 8 and from which the liquid may make its way through the sleeve 9 as far as the end of the pot 7 and from this point the liquid then goes on further radially outwards and after getting as far as the cylindrical part of the pot 7 makes its way through the space between the permanent magnets 14 and the pot 7 into a helical duct 17, that is part of the pot 7 and in which heat exchange may take place between the pot 7 and the liquid. From this point the liquid then goes into the header or plenum in the form of the pocket in the cover 8 and comes out of the unit by way of the outlet port 19.

For producing heat the driver 3 is turned by the motor so that the permanent magnets 14 and the rotor 10 on which they are magnetically fixed are turned by the permanent magnets 4 by magnetic attraction, there then being a turning motion of the magnetic flux or field in relation to the stationary pot 7 and the production of eddy currents in the pot 7. The pot 7 is made of a material with a good electrical conductivity, as for example copper or aluminum, so that the eddy currents produced hardly come up against any resistance and free flux thereof is possible. Eddy currents are furthermore produced in the liquid film crossing the magnetic field between the permanent magnets 14 of the rotor 10 and the inner side of the pot 7, such eddy currents then being responsible for a direct heating effect on the liquid, if it is electrically conducting. The eddy currents flowing in the pot 7 create a heating effect that is proportional to the relative motion between the magnetic field and the pot 7 and this heat is then taken up by the fluid. Thereby temperatures of 450° C. and more may be produced. If there is not a high enough pressure acting on the fluid for causing flow thereof, one may have pumping or impelling blades 20 on the rotor for causing a pumping effect and keeping the liquid on the move through the unit.

Surprisingly high efficiencies have been produced with heaters in keeping with the present invention. As related to the measured power uptake of the driving motor, the efficiency, as based on the temperature difference between the inlet and outlet water and to the rate of flow was 99.3%. If one does not take the (in any case minute) rate of bearing wear into account, such an efficiency may be kept up for unlimited stretches of time seeing that there is no mechanical contact at the points or zones of heat production and the permanent magnets are not in need of any upkeep.

It will be seen that there is no point at which the fluid moving through the unit comes into contact with sealing faces running on each other, as in a stuffing box or gland where a shaft is run through the wall of a sealed space. In fact the opposite is the case inasfar as all the transfer points have flange seals with a large surface area so that one may be certain from experience that there is very little chance of any leakage. This property makes the heat producer of the present invention more specially of value for heating highly reactive fluids that, because they are aggressive or because of instability are to be kept in sealed systems without any contact with the outside.

Figure 2:
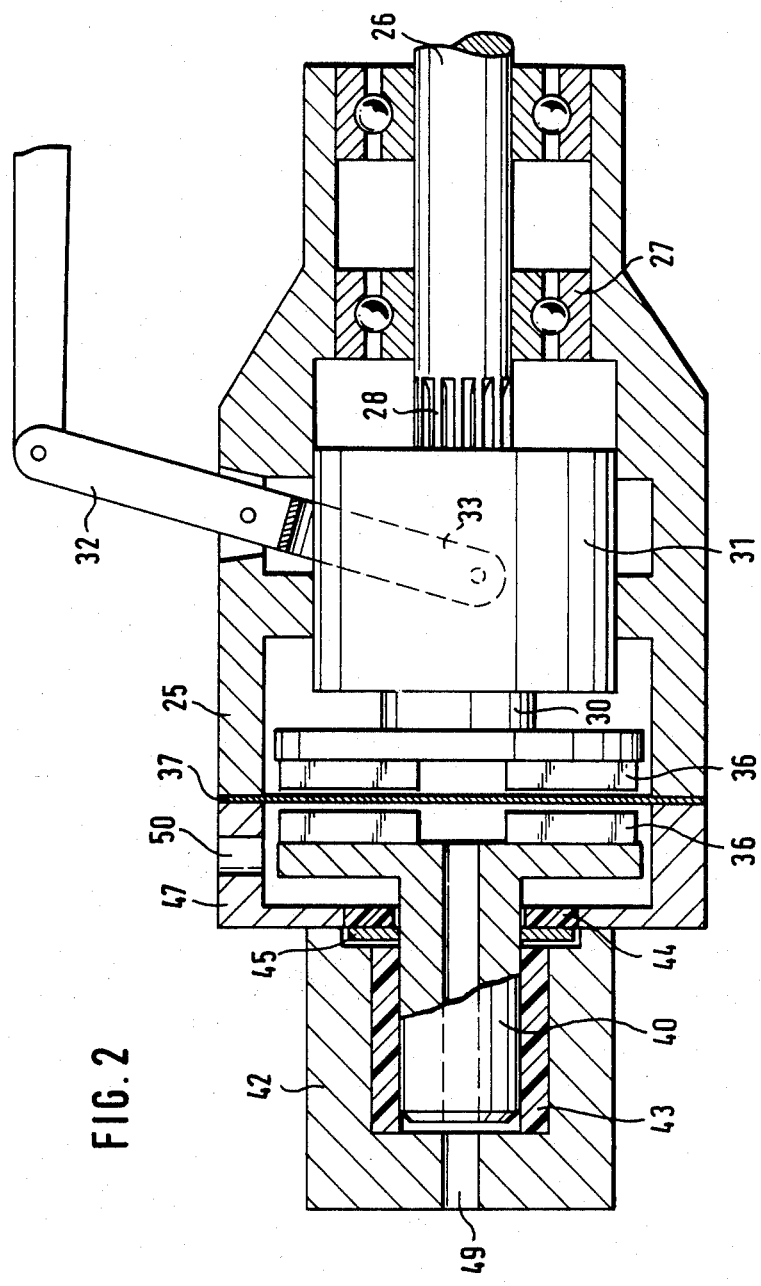
FIG. 2 is a view of a further working example of the invention for heating a moving or flowing fluid.

FIG. 2 is a view of a further working example of the invention in the form of a heat generator. Unlike the example of FIG. 1, the permanent magnets have two facing, spaced radial planes in plane of cylindrical faces placed one inside the other as in FIG. 1. In the one housing part 25 there is a drive shaft 26 that is supported in bearings marked diagrammatically at 27 and has a polygonal end 28 keyed into a driver 30, that for its part is axially locked in a sliding sleeve 31 in which it is bearinged and supported, so that sliding motion of the sleeve 31 will be responsible for an axial motion of the driver without the same being pulled clear or otherwise unjoined from the polygonal end 28 of the shaft 26. The sleeve 31 is in fact moved by a lever 32 pivoted in the housing part 25. The lower end of the lever 32 is forked at 33 and is joined up with pins on the two opposite sides of the sleeve 31.

On its side turned away from the shaft 26 the driver 30 is fitted with permanent magnets 36, that are each formed like a sector and are pieced together as a complete ring without any spaces therein. In the one end position of the driver 30 to be seen in the figure the permanent magnets 36 will be seen to be right in front of and next to a separating wall 37, on whose other side there is a structure generally like the driver 30 in the form of a rotor 40, that as well is fitted with permanent magnets 36. However the rotor 40, while being able to be turned freely, may not be moved axially, unlike the driver 30. For supporting the rotor 40 there is a bearing bush 43 let into a further housing part 42, the bush 43 keeping the rotor 40 radially in place. With respect to axially keeping the rotor 40 in place such an effect is only needed in one direction, seeing that because of the magnetic forces the rotor is pulled towards the separating wall 37. The rotor 40 has a collar 45 thereon limiting motion towards the driver and bearing against a bearing ring 44 on a middle housing part 47.

In operation the fluid to be heated comes in through an inlet port 49 running into the housing part 42 from which it makes its way as far as the separating wall 37 through the axial hole in the rotor 40. From this point the fluid is moved radially outwards and comes out of the heat producer of the invention by way of the outlet port 50. When the heat producer is run on liquids, the bearings of the rotor 40 will be oiled by the liquid itself, this furthermore being true in respect of the bearings of the rotor 10 of the working example of FIG. 1. If the fluid heated is a gas, separate means will be needed for lubrication. In this connection ball bearings might be used in place of plain bearings.

The fact that the driver 30 may be axially moved in relation to the separating wall 37 and for this reason in relation to the rotor 40 is to make possible control of the amount of heat produced. The eddy currents coming into being in the separating wall 37 and that in fact are responsible for heating, are dependent on the speed of the relative motion between the magnetic field and the separating wall and on the intensity of the magnetic field. If there is a drop in the intensity there will as well be a decrease in the heating of the separating wall. The decrease in the strength of the magnetic field is produced by the axial motion of the driver 30, because the pervasion by magnetic flux for two magnets attracting each other goes down in keeping with a function that is a power of the distance. In place of a system for moving the driver 30 it would be possible to have one for moving the rotor 40, but this would be at the price of giving up the encapsulated design. As described hereinbefore the amount of heat produced may be changed for control purposes not only by using a weaker magnetic field but furthermore by changing the speed of turning, or, as will be clear, by using these two control effects together.

The automatic control noted in connection with FIG. 2 would be possible in the apparatus of FIG. 1 as well. In this case the driver 3 would be supported in its bearings so that it might be moved axially, such motion in fact being produced by a servo or actuator or by a lever system to get the driver into the desired positions. This would then not have the effect of simply pulling the permanent magnets 4 and 14 of the driver and rotor away from each other but of decreasing the degree of overlap thereof, that would in fact have the same effect in connection with the magnetic field strength as a simple increase in the distance between the rotor and the driver.

Figure 3:
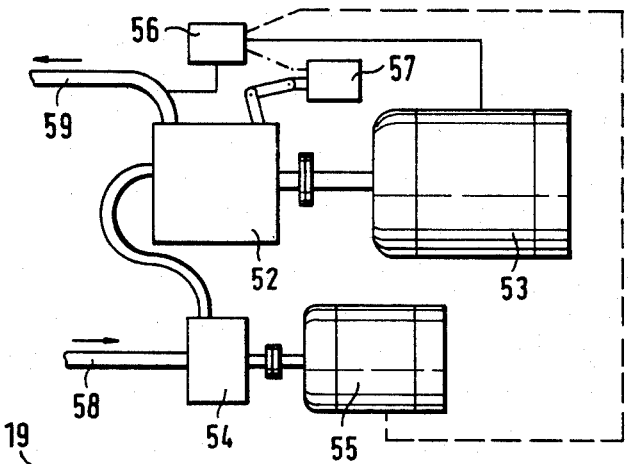
FIG. 3 is a block schematic of a plant according to the invention for heating a moving fluid.

From FIG. 3 the reader will be able to see a plant for heating a moving fluid in the form of a block schematic. The separate parts of the system, to be detailed hereinafter, are fixed for example on a frame or inside a housing so that the outcome is a unit that may be put on the market and may be transported from place to place in one piece, having an inlet port, an outlet port, and, if it is to be electrically run, an electrical connection.

The main part or core of the plant is formed by a heat producer 52 as in one of the two examples of the invention noted hereinbefore. By way of a shaft coupling the driver of the heater unit is joined up with an electric motor 53, that may be taken to be the main motor for the present purposes. For running a circulation pump 54 there is in fact a further electric motor 55, that as well is joined up by way of shaft coupling with the pump 54. If the heater is used for fluids in the form of gases, a compressor will be used in place of the pump 54.

By way of an inlet port 58 or connector the fluid makes its way through the pump 54 or a compressor, whichever may be the case, to the heat producer 52, from which it comes out through the outlet port 59 at a temperature that is thermostatically and automatically controlled. For the automatic thermostatic control of the temperature there is a temperature feeler 56 giving a reading for the temperature of the fluid at a point downstream from the heat producer 52. In the FIG. 3 three different ways in which the temperature feeler or sensor may take effect on the rest of the plant are marked.

In full lines a connection between the temperature feeler 56 with the electric motor 53 will be seen as being representative of an automatic control loop. This control loop makes it possible for the speed of the electric motor 53 to be adjusted so that when the temperature of the fluid goes over a given desired value or set point it will then be possible for the motor 53 to be slowed down, and when the temperature goes under the said limit, the motor may be speeded up. If there is an internal combustion engine in place of an electric motor, then speed control will be by changing the air fuel mixture or in the case of a diesel engine the fuel supply rate will be changed.

For certain purposes the rate of flow of fluid through the unit is unimportant if only the fluid keeps to the desired temperature. In this case automatic control of the temperature is possible by changing the flow rate, this being marked in broken lines in the figure. The temperature feeler 56 then in fact takes effect on the speed of the pump 54, or of a compressor if used, in such a way that when the temperature goes down under a desired value or set point, the flow rate is cut back and when the temperature goes over the desired value the flow rate will be stepped up. As a change in this system it would be possible to have (in connection with a electric motor driving the pump at a given rated speed) an adjustable valve in the pipe running from the pump 54 to the heat producer 52, the adjustable valve then being under the control of the feeler 56 for the temperature.

Lastly, in the case of a system using a heat producer 52 with a driver moving axially in relation to the rotor as in FIG. 2, it would be possible to have the third form of control loop, that is marked by a chained line. Axial adjustment is caused by a servo motor 57 that is for its part under the control of the temperature feeler 56 so that when the temperature goes down under a given set point or desired value the driver will be moved nearer to the rotor whereas if the temperature goes up over the given value the driver will be moved further away from the rotor.

It has been seen from experience with the invention that when it is used for certain purposes the heating of the separating wall or of the pot is so strong that, if there is no fluid in the unit the material of the wall will be likely to be heated to its melting point, and for stopping any such damage it is best for the unit to be designed with a temperature measuring part, for example in the form of an on-off thermostat such as a thermoelement, on the separating wall 37 or on the pot 7, such measuring part then being tripped at a given temperature level so that the production of heat is shut down at once. The given temperature level will be much higher than the working temperature. Such a quick shut down of the unit may be produced for example by stopping the main motor 53, by quickly separating the driver and rotor from each other or by the injection of a cooling liquid, for example on the driving side of the parting wall or of the pot 7. In the last-named case the production of heat will not be stopped but only put off for some time.

In the working examples so far the fluid to be heated comes up against the parting wall 37 or the pot 7 from one side. In the case of readily handled materials however that do not have any undesired effects on coming into contact with machinery—this will be the case with hot machine oils and the like—the fluid may take effect of the two sides of the parting wall so that the driver will be turning in the fluid as well. To this end it will only be necessary to have a fluid-tight shaft gland where the shaft is run through the housing and the necessary system of ports. It would furthermore be possible to have two separate fluid circuits each on a different side of the separating wall or the pot, whichever is the case. The fluids in the two circuits might then be unlike each other in respect of the sort of fluid, its consistency and other properties; in fact one of the fluids might be a readily handled one and the other a highly reactive or unstable fluid, the two fluids being heated in one and the same unit.

As a general point it is to be noted that, whatever the limiting details given in connection with the working examples of the invention, the production of heat at the parting wall or the pot, whichever may be the case, is dependent on the strength of the magnetic field, other conditions keeping unchanged. To get a good yield it is for this reason best to have strong permanent magnets. For running the unit in a temperature range of up to 200° C. samarium-rare earth metal-cobalt alloys or the like would be used while for temperatures in a range of 200° to 450° C. materials such as Alnico may be used. At still higher temperatures electromagnets will be used, that would be supplied with current through slip-rings.

In the description so far it has been said that the flow of the fluid is on the outer side of the part wall or pot. This is however not necessary in all cases and in fact the parting wall of the pot may have a double walled structure through which the fluid, with or without a further fluid, is forced. Furthermore it would be possible to have holes running along within the wall in the plane thereof, or if the separating wall or pot is in the form of a double wall, it might then have folds in its surface.

We claim:

1. An apparatus for heating a moving fluid comprising: a frame, a rotationally driven driver formed as a hollow cylinder and supported by said frame for rotation therein, magnet means on an inner face of said driver, a rotor formed as a cylinder and supported for rotation in said frame and placed therein with an outer face thereof opposite the inner face of said driver, magnet means on the outer face of said rotor, said driver being placed in relation to said rotor for rotationally driving the same by the attraction force of both said magnet means in response to rotation of said driver, a separating wall between said opposite faces of said driver and said rotor, said wall being made of a material with a low electrical resistance, and means defining ports in said frame for the inlet of fluid into said frame, over a face of said wall and out of said frame.

2. The apparatus as claimed in claim 1 wherein said frame is in the form of a fluid-tight housing disposed round said driver and said rotor.

3. The apparatus as claimed in claim 1 wherein said separating wall is in the form of a pot having a wall part in the form of a hollow cylinder with an end wall part at one end thereof, said port means comprising an inlet port for the supply of the said fluid through the rotor as far as said end wall, and means defining a plenum joined with a space between the rotor and the end wall of said pot, said port means further comprising an outlet port joined with said plenum.

4. The apparatus as claimed in claim 1 comprising impeller means for the purpose of moving fluid on a side of said rotor turned towards said pot end wall.

5. The apparatus as claimed in claim 1 wherein said wall is made of a material with a low resistivity of the same order as the resistivity as a metal selected from the group consisting of copper and aluminum.

6. The apparatus as claimed in claim 1 wherein said wall has structures on a face thereof for increasing the surface area.

7. The apparatus as claimed in claim 1 comprising, as said magnet means, at least one full or complete ring of magnetic material.

8. The apparatus as claimed in claim 7 comprising separate plate-like magnets arranged to form said ring.

9. The apparatus as claimed in claim 1 wherein said driver and said rotor are mounted to be moved along the axes of rotation thereof in relation to each other, said apparatus further comprising means for moving said driver and said rotor along said axes and locking them in at least one desired position.

10. In a plant for heating a moving fluid using a mechanically powered heat producer: a prime mover, an output shaft connected to be rotationally driven by said prime mover, said heat producer comprising a rotary driver joined with said output shaft to be rotationally driven thereby, magnet means on said driver, a rotor mounted to be rotationally driven by said driver by forces of magnetic attraction, a wall disposed between said driver and said rotor, said wall being made of a material with a low electrical resistivity, and port means for flowing said fluid over a surface of said wall, a temperature feeler disposed between said heat producer and an outlet port of said port means, and an automatic controller for controlling said prime mover by changing the speed of rotation thereof or by switching off or on said prime mover when a temperature as sensed by said temperature feeler goes outside given upper and lower limits.

11. The plant as claimed in claim 10 comprising an on-off thermostatic switch on said wall for the purpose of turning off said prime mover when the temperature of said fluid is greater than an upper limit.

12. The plant as claimed in claim 10 comprising a housing in which said heat producer is placed, and a frame supporting said housing and other parts of said plant.

13. The plant as claimed in claim 12 wherein said wall is in the form of a pot with a hollow cylindrical wall and an end wall at one end thereof, said port means having means for flowing said fluid through said rotor as far as the end wall of said pot, said plant further comprising means defining a plenum space to take up said fluid from said end wall to an outlet port as a further part of said port means.

14. The plant as claimed in claim 10 wherein said driver is in the form of a hollow cylinder and said rotor is in the form of a cylinder inside said hollow cylinder, said magnet means being in the form of permanent magnets on an outer face of said rotor and an inner face of said driver.

15. The plant as claimed in claim 10 wherein said wall is made of a material with an electrical resistivity with a low value and of the same order as the resistivity of a metal selected from the group consisting of copper and aluminum.

16. The plant as claimed in claim 10 wherein said wall has surface structures for increasing the surface area thereof.

17. The plant as claimed in claim 10 wherein said magnet means is made up of magnet plates placed side by side in contact with each other in at least one ring.

18. In a plant for heating a moving fluid using a mechanically powered heat producer: a prime mover, an output shaft connected to be rotationally driven by said prime mover, said heat producer comprising a rotary driver joined with said output shaft to be rotationally driven thereby, magnet means on said driver, a rotor mounted to be rotationally driven by said driver by forces of magnetic attraction, a wall disposed between said driver and said rotor, said wall being made of a material with a low electrical resistivity, and port means for flowing said fluid over a surface of said wall, a temperature feeler between said heat producer and an outlet port of said port means, and a flow rate controller placed in part of said port means for controlling the rate of flow of said fluid therethrough, said rate controller being operative to adjust the rate of flow of said fluid when the temperature of said fluid goes outside certain desired upper and lower set points.

19. The plant as claimed in claim 18 comprising a circulation pump for said fluid and a controller for changing the speed of operation thereof for the purpose of effecting said flow rate adjustment.

20. In a plant for heating a moving fluid using a mechanically powered heat producer: a prime mover, an output shaft connected to be rotationally driven by said prime mover, said heat producer comprising a rotary driver joined with said output shaft to be rotationally driven thereby, magnet means on said driver, a rotor mounted to be rotationally driven by said driver by forces of magnetic attraction, a wall disposed between said driver and said rotor, said wall being made of a material with a low electrical resistivity, and port means for flowing said fluid over a surface of said wall, a termperature feeler placed between said heat producer and an outlet port forming part of said port means, said driver and said rotor being mounted to be moved axially in relation to each other, a servo for causing such axial motion of said driver and said rotor in their relation to each other, and a controller operating to produce an output reading from said termperature feeler and make an adjustment in the relative axial position of the driver and rotor when said temperature reading goes out of a given desired temperature range for and of said fluid.

21. In a plant for heating a moving fluid using a mechanically powered heat producer: a prime mover, an output shaft connected to be rotationally driven by said prime mover, said heat producer comprising a rotary driver joined with said output shaft to be rotationally driven thereby, magnet means on said driver, a rotor mounted to be rotationally driven by said driver by forces of magnetic attraction, a wall disposed between said driver and said rotor, said wall being made of a material with a low electrical resistivity, and port means for flowing said fluid over a surface of said wall, a temperature feeler between the heat producer and an outlet port forming part of said port means, a servo for changing the relative axial position of said driver and said rotor, and a controller for operation of said servo in keeping with an output signal of said temperature feeler and causing by way of said servo an increase in the axial distance between the driver and the rotor when the temperature goes up out of a given temperature range and a decrease in said distance when said temperature goes down under said range.

22. Apparatus for heating a fluid comprising: a first rotary member having a hollow generally cylindrical portion and being rotationally driven during use of the apparatus by an external source of motive power; a second rotary member having a generally cylindrical portion disposed within the first rotary member hollow portion and spaced from the first rotary member to define a gap therebetween; an electrically conductive wall member disposed within the gap between the first and second rotary members; magnetic flux generating means for generating magnetic flux across the gap between the first and second rotary members, the magnetic flux generating means comprising first magnet means disposed circumferentially around the inner face of the first rotary member hollow portion for producing magnetic flux, and second magnet means disposed circumferentially around the outer face of the second rotary member for producing magnetic flux which coacts with the magnetic flux produced by the first magnet means to effect magnetic rotational driving of the second rotary member in response to rotation of the first rotary member to thereby induce eddy currents in the wall member to heat up the wall member; and means for flowing a fluid in heat-exchange relationship with the wall member to enable the fluid to extract heat energy from the heated-up wall member thereby heating the fluid.

23. Apparatus according to claim 22; wherein the wall member has a tubular portion interposed in the gap between the aforesaid inner and outer faces.

24. Apparatus according to claim 22; wherein the first rotary member has a generally disk-shaped portion with the first magnet means being disposed around one major face thereof; and the second rotary member has a generally disk-shaped portion with the second magnet means being disposed around one major face thereof in opposed facing relation to the first magnet means.

25. Apparatus according to claim 24; wherein the wall member extends in the gap between the aforesaid opposed major faces.

26. Apparatus according to claim 22; wherein the electrically conductive wall member has a low resistivity which is of the same order as either copper or aluminum.

* * * * *